US007813291B2

(12) United States Patent
Yoon et al.

(10) Patent No.: US 7,813,291 B2
(45) Date of Patent: Oct. 12, 2010

(54) METHOD AND APPARATUS FOR REQUESTING AND REPORTING CHANNEL QUALITY INFORMATION IN MOBILE COMMUNICATION SYSTEM

(75) Inventors: Chul-Sik Yoon, Daejeon (KR); Jae-Heung Kim, Daejeon (KR); Kun-Min Yeo, Daejeon (KR); Soon-Yong Lim, Daejeon (KR); Byung-Han Ryu, Daejeon (KR)

(73) Assignees: Electronics and Telecommunications Research Institute (KR); Samsung Electronics Co., Ltd. (KR); KT Corporation (KR); SK Telecom Co., Ltd. (KR); KTFreetel Co., Ltd (KR); Hanaro Telecom, Inc. (KR)

( * ) Notice: Subject to any disclaimer, the term of this patent is extended or adjusted under 35 U.S.C. 154(b) by 480 days.

(21) Appl. No.: 10/583,165

(22) PCT Filed: Dec. 17, 2004

(86) PCT No.: PCT/KR2004/003344

§ 371 (c)(1),
(2), (4) Date: Nov. 3, 2008

(87) PCT Pub. No.: WO2005/060132

PCT Pub. Date: Jun. 30, 2005

(65) Prior Publication Data

US 2009/0175178 A1 Jul. 9, 2009

(30) Foreign Application Priority Data

Dec. 18, 2003 (KR) ............ 10-2003-0093283
Oct. 15, 2004 (KR) ............ 10-2004-0082661

(51) Int. Cl.
*H04J 1/16* (2006.01)

(52) U.S. Cl. .............. 370/252; 370/329; 370/332; 455/67.13; 455/452.2; 455/509
(58) Field of Classification Search ........... 370/252, 370/328, 329; 455/67.13, 67.14, 452.2
See application file for complete search history.

(56) References Cited

U.S. PATENT DOCUMENTS

2003/0054847 A1* 3/2003 Kim et al. ............... 455/517

(Continued)

FOREIGN PATENT DOCUMENTS

JP 2003-204298 7/2003

(Continued)

*Primary Examiner*—Ricky Ngo
*Assistant Examiner*—Rasheed Gidado
(74) *Attorney, Agent, or Firm*—The Farrell Law Firm, LLP

(57) ABSTRACT

Disclosed is a method and device for requesting and reporting channel quality information in a mobile communication system. A base station a locates a dedicated feedback channel for channel quality information report to an uplink radio resource, transmits the allocation information to subscriber stations, and generates a CQI report message to request channel quality information from the subscriber stations. The subscriber stations receive the CQI report message from the base station, measures a radio channel quality for communication with the base station, generates channel quality information, generates a CQI response message including the channel quality information, and transmit—the CQI response message to the base station through a dedicates feedback channel designated in the allocation information.

10 Claims, 14 Drawing Sheets

U.S. PATENT DOCUMENTS

| | | | |
|---|---|---|---|
| 2003/0087605 A1* | 5/2003 | Das et al. | 455/67.1 |
| 2003/0112778 A1* | 6/2003 | Lundby | 370/335 |
| 2003/0148770 A1* | 8/2003 | Das et al. | 455/455 |
| 2003/0157900 A1* | 8/2003 | Gaal et al. | 455/69 |
| 2003/0185242 A1* | 10/2003 | Lee et al. | 370/491 |
| 2004/0114574 A1* | 6/2004 | Zeira et al. | 370/352 |
| 2004/0179493 A1* | 9/2004 | Khan | 370/332 |
| 2004/0203717 A1* | 10/2004 | Wingrowicz et al. | 455/423 |
| 2005/0094596 A1* | 5/2005 | Pietraski et al. | 370/329 |
| 2005/0111462 A1* | 5/2005 | Walton et al. | 370/395.4 |

FOREIGN PATENT DOCUMENTS

| | | |
|---|---|---|
| KR | 1020030077732 | 10/2003 |

\* cited by examiner

FIG. 13

```
Report_Request_Message_Format(){
    Management Message Type,//8-bit
    Report Type,//8-bit,CINR or RSSI
    Number of Basic CIDs N, //8-bit
    for(i=0;i<N;i++)
    {
        Basic Connection ID,//16-bit,CID to which this message refers
    }
}

Report_Response_IE(){
    Mean,//8-bit
    Standard Deviation,//8-bit
}
```

METHOD AND APPARATUS FOR REQUESTING AND REPORTING CHANNEL QUALITY INFORMATION IN MOBILE COMMUNICATION SYSTEM

BACKGROUND OF THE INVENTION (a) Field of the Invention

The present invention relates to a mobile communication system. More specifically, the present invention relates to a method and apparatus for requesting and reporting channel quality information (CQI) in a wireless portable Internet system.

(b) Description of the Related Art

The wireless portable Internet is a next generation communication system for further supporting mobility, in addition to a short range data communication system which uses stationary access points (APs) such as the conventional wireless local area network (LAN). Various standards have been proposed for the wireless portable Internet, and the international standardization on the portable Internet is in progress by the IEEE 802.16.

The wireless LAN system such as the conventional IEEE 802.11 provides a data communication system which allows short-range radio communication with reference to stationary access points, which provides no mobility of the subscriber station (SS) but which supports wireless LAN data communication in a local area other than wired LAN data communication.

Meanwhile, a new wireless portable Internet system currently progressed by the IEEE 802.16 working group is designed to support the mobility to the subscriber station and thus provide a seamless data communication service thereto when the subscriber station moves from one cell to another cell.

The mobile communication systems including the above-described wireless portable Internet system have been developed for communication systems which support speech services and high-speed packet data services.

Reported information on the radio channel quality of a link to a subscriber station on the move is very important since the information is used to determine an appropriate adaptive modulation and channel coding (AMC) level for the corresponding link to the subscriber station in the system for supporting high-speed mobility. Since the reported information on the radio channel quality is found to be erroneous, a resource allocated to the link to the subscriber station may be wasted, it is accordingly very important to provide reliable channel quality information (CQI) to a scheduler of the base station.

In order to collect information on the channel quality, the base station selects a predetermined subscriber station for each slot from among a plurality of subscriber stations, transmits packet data thereto, and receives channel quality information on a forward channel from the selected subscriber station to determine transmission parameters such as data rates, channel coding rates, and modulation orders.

When the base station transmits a CQI report message to a plurality of subscriber stations, each subscriber station reports a channel quality measurement result to the base station in a specified message format.

However, the method for the base station to request the channel quality information from a plurality of subscriber stations in the case of one frame may exhaust downlink resources since the base station transmits similar messages to the subscriber stations individually. Further, when the base station transmits the message to the subscriber station by using an inadequate AMC level, in detail, when the base station transmits the CQI report message thereto by using the AMC level determined based on the existing reported channel quality even though the channel has already been degraded, some subscriber stations may fail to receive the CQI report message.

Also, overheads of messages are increased when the respective subscriber stations individually transmit a response message for the channel quality measurement result to the base station.

In addition, the subscriber station guarantees no allocation of uplink resources for transmitting the response message of the channel quality measurement result, and hence, undesired delay may be generated when the subscriber station transmits the response message to the base station. As a result, the subscriber stations may fail to transmit the on-time response message thereto, and the base station may not adaptively process the mobile environment.

SUMMARY OF THE INVENTION

It is an advantage of the present invention to quickly and efficiently provide reliable channel quality information (CQI), and determine the adaptive modulation and channel coding (AMC) level used for data transmission between the base station and subscriber stations in a mobile communication system.

It is another advantage of the present invention to reduce overheads of message transmission and allow reception of messages by the subscriber stations without errors when the subscriber stations transmit a CQI report message to the base station.

In one aspect of the present invention, a method for reporting channel quality information by a subscriber station in a mobile communication system comprises: (a) receiving uplink radio resource allocation information to which a dedicated feedback channel for reporting the channel quality information is allocated from a base station; (b) receiving a CQI report message from the base station; (c) measuring a radio channel quality for communication with the base station, and generating channel quality information; (d) generating a CQI response message including the channel quality information; and (e) transmitting the CQI response message to the base station through a dedicated feedback channel in the uplink.

The CQI report message is broadcast, and it includes identifiers of at least one subscriber station arranged in a predetermined order.

The step (e) further comprises: checking the order of identifiers of corresponding subscriber stations arranged in the CQI report message; identifying a radio resource allocated to the subscriber station by the order of the CQI report requested to each subscriber station; and transmitting a CQI response message to the base station through the identified radio resource in the dedicated feedback channel.

In another aspect of the present invention, a method for requesting channel quality information from subscriber stations in a mobile communication system comprises: (a) allocating a dedicated feedback channel for a channel quality report to an uplink radio resource; (b) transmitting uplink radio resource allocation information to the subscriber stations so that the subscriber stations may report CQI through the dedicated feedback channel; (c) generating a CQI report message; and (d) transmitting the CQI report message to the subscriber stations to request a CQI report from the subscriber stations.

The step (c) comprises generating a CQI report message including identifiers of at least one subscriber station, and the step (d) comprises broadcasting the CQI report message to at least one subscriber station to request a CQI report from the subscriber stations.

In still another aspect of the present invention, a method for requesting and reporting radio channel quality information in a mobile communication system to which a base station and subscriber stations are coupled through a mobile communication network, comprises: (a) allowing the base station to allocate a dedicated feedback channel for channel quality report, and transmitting the allocation information to the subscriber stations; (b) generating a CQI report message, broadcasting the CQI report message, and requesting a CQI report from at least one subscriber station; (c) allowing the subscriber stations to receive the CQI report message, measure a radio channel quality for communication with the base station, and generate channel quality information; and (d) allowing the subscriber station to generate a CQI response message including channel quality information and transmit the CQI response message to the base station through a dedicated feedback channel for a channel quality report.

In still yet another aspect of the present invention, a base station for requesting channel information in a mobile communication system comprises: a base station resource controller for generating uplink radio resource allocation information in which a dedicated feedback channel for CQI report is allocated to an uplink radio resource, and including a channel information requester for generating a CQI report message; a digital signal transmitter for performing adaptive modulation and coding on the uplink radio resource allocation information and the CQI report message to generate digital signals; and an analog signal transmitter for converting the digital signals into analog signals and transmitting the analog signals to the subscriber stations, wherein the base station resource controller transmits the uplink radio resource allocation information to the subscriber station and transmits the CQI report message thereto.

The channel information requester comprises: a dedicated channel allocator for generating an uplink radio resource allocation information in which a dedicated feedback channel for reporting the channel quality information is allocated to an uplink radio resource; a subscriber station designator for designating at least one subscriber station for requesting channel information; and a request message generator for generating a CQI report message including identifiers of the designated subscriber stations.

In a still further aspect of the present invention, a subscriber station for reporting channel quality information in a mobile communication system, comprises: a message parser for receiving a CQI report message from a base station and parsing the CQI report message; a channel quality measurer for measuring radio channel quality of the communication link to the base station, and generating channel quality information; a response message generator for generating a CQI response message including the channel quality information; a resource allocation checker for receiving uplink radio resource allocation information with a dedicated feedback channel for reporting the channel quality information provided by the base station, storing the uplink radio resource allocation information, and checking a radio resource allocated for CQI report according to the parsed message result; and a transmitter for transmitting the CQI response message to the base station through the allocated radio resource.

The CQI report message includes identifiers of at least one subscriber station arranged in the same order as the allocated CQI, and the resource allocation checker checks a radio resource position at which the subscriber station reports channel quality information through the dedicated feedback channel according to the order of identifiers of the corresponding subscriber stations arranged in the CQI report message.

BRIEF DESCRIPTION OF THE DRAWINGS

The accompanying drawings, which are incorporated in and constitute a part of the specification, illustrate an embodiment of the invention, and, together with the description, serve to explain the principles of the invention, wherein:

FIG. 13 shows a format of the CQI report message according to an exemplary embodiment of the present invention.

DETAILED DESCRIPTION OF THE PREFERRED EMBODIMENTS

Figure 1:
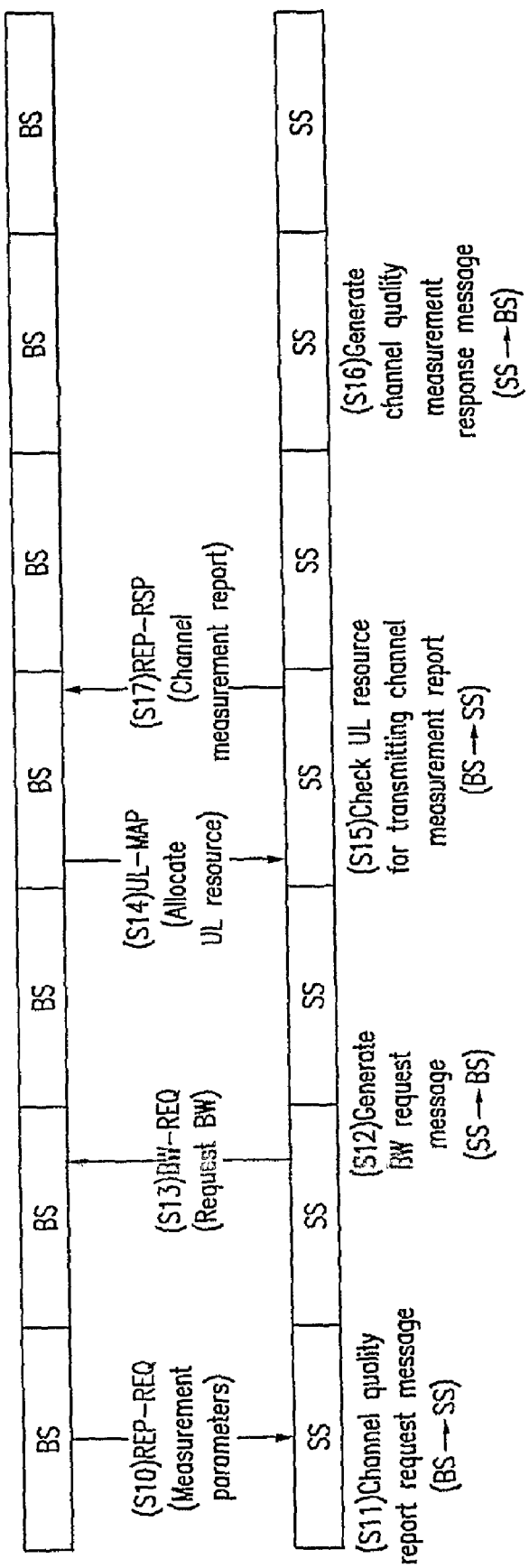
FIGS. 1 to 3 show general flowcharts for requesting and reporting channel quality information.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

Figure 2:
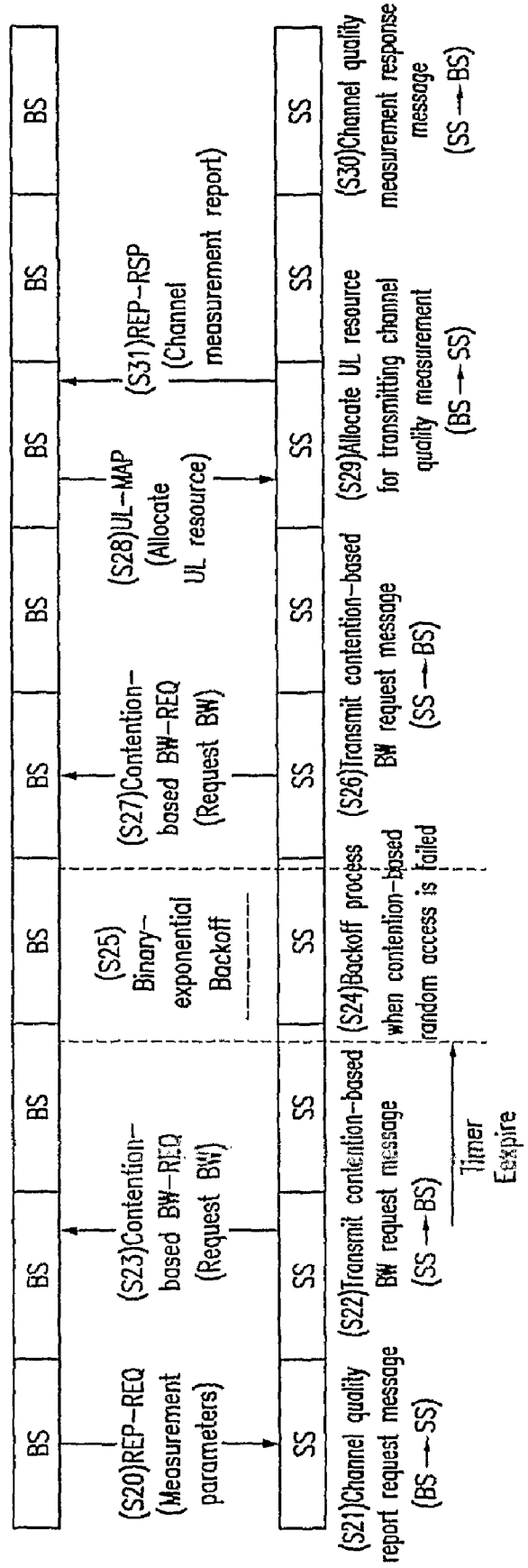
Figure 3:
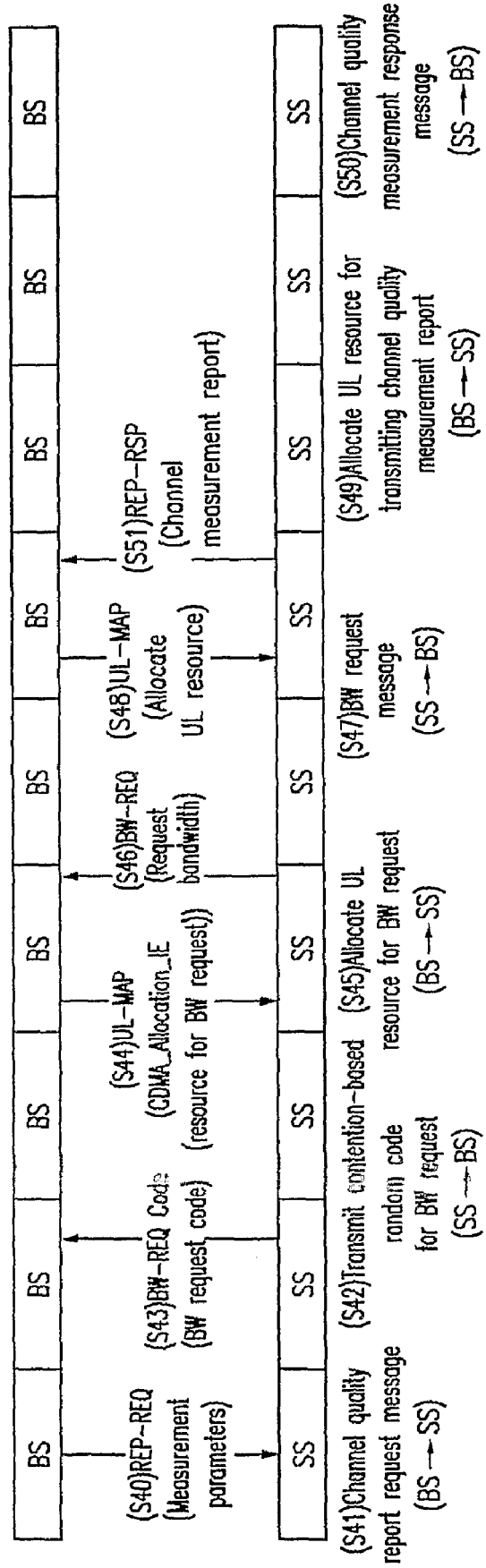

FIGS. 1 to 3 show general flowcharts for measuring and reporting channel quality information in a mobile communication system.

Referring to FIG. 1, in order to measure the radio channel quality between a base station and a subscriber station, the subscriber station receives a CQI request from the base station and requests a bandwidth for a channel measurement report therefrom in steps S10 to S13, the base station allocates an uplink resource to the subscriber station in steps S14 and S15, and the subscriber station uses the uplink resource and transmits the channel measurement report to the base station in steps S16 and S17.

However, a delay occurs because of the request and allocation of the uplink bandwidth until the subscriber station reports the channel measurement information to the base station, since the base station allocates no uplink resource to be used for the channel measurement report in advance when requesting channel quality information from the subscriber station, thereby very probably failing to quickly process the varied channel condition and satisfy the quality of service (QoS).

FIG. 2 shows a process for the subscriber stations using contention-based bandwidth request. The respective subscriber stations competitively request a bandwidth for a channel measurement report from the base stations in steps S20 to S23, and when the contention-based request is failed, the subscriber stations attempt a contention-based bandwidth request again through a backoff process in steps S24 to S27. When the attempt is found to be successful, the base station allocates an uplink resource to the corresponding subscriber station, and the subscriber station transmits a channel measurement report to the base station through the allocated uplink resource in steps S28 to S30. In this case, an unpredictable delay is generated by the backoff, and the request and allocation of the uplink bandwidth.

FIG. 3 shows a process for a subscriber station to transmit a random code for a bandwidth request to the base station in the general case of requesting and reporting the channel quality information.

When the subscriber station transmits a random code for a bandwidth request to the base station according to the channel quality information provided by the base station in steps S40 to S43, the base station cannot determine from the bandwidth request code whether the subscriber station will transmit bandwidth request information (i.e., an amount of data stored in a transmission buffer of uplink data) or transmit the message for the channel measurement report. Accordingly, the subscriber station may be delayed in transmitting the message for the channel measurement report to the base station even though the subscriber station has successfully transmitted the random code to the base station, and hence, the time delay is inevitable.

As shown in FIG. 3, when the base station allocates a resource for a bandwidth request and the subscriber station transmits a bandwidth request message before the subscriber station transmits the channel measurement report to the base station, the base station must allocate the uplink resource in steps S44 to S49, and hence, a time delay is generated and it is difficult to guarantee the QoS because of the undesired delay.

Also, the base station must transmit a CQI report message to each subscriber station that will generate a channel measurement report. Hence, when transmitting the CQI report message to a plurality of subscriber stations in a frame, the base station respectively transmits the same unicast message (e.g., a basic connection identifier (CID) according to the IEEE 802.16 standard) to the subscriber stations, thereby increasing overheads.

To resolve the above-described problems generated while requesting and reporting the channel quality information in the mobile communication system, a subsequent method will now be described.

Figure 4:
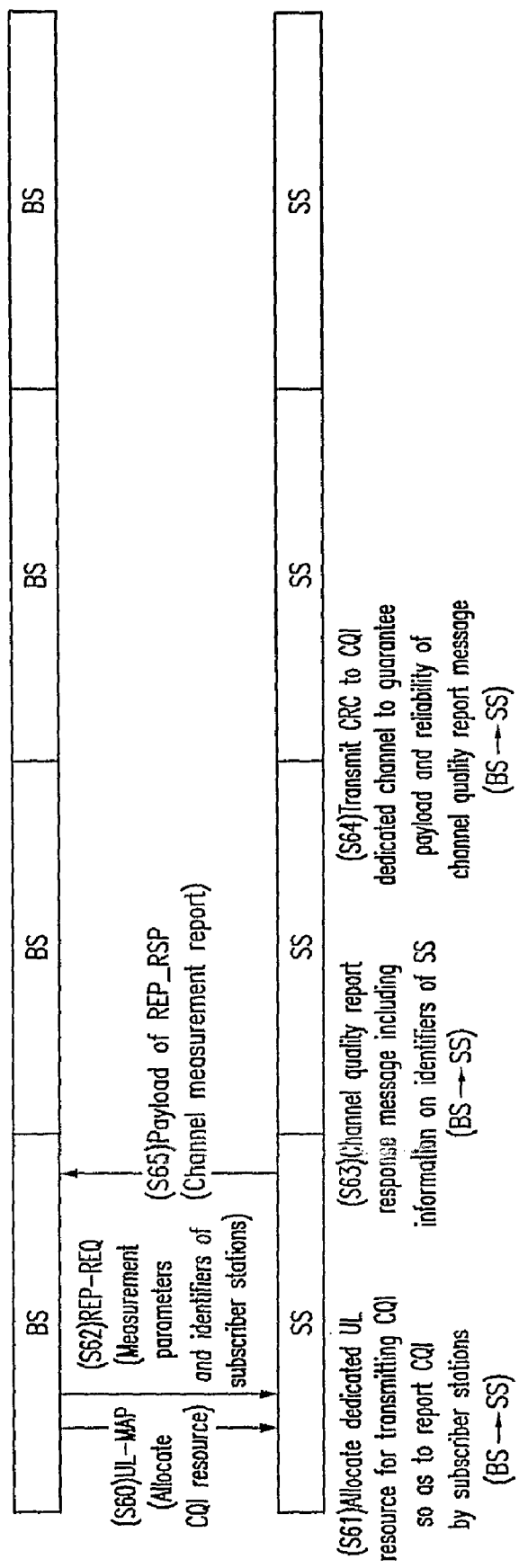
FIG. 4 shows a flowchart for requesting and reporting channel quality information according to an exemplary embodiment of the present invention.

FIG. 4 shows a flowchart for requesting and reporting channel quality information according to an exemplary embodiment of the present invention.

As shown, the base station allocates a radio uplink resource for a CQI report before transmitting a CQI request to each subscriber station in steps S60 and S61, and broadcasts a CQI report message including identifier information of each subscriber station for reporting per-frame channel quality information to a plurality of subscriber stations in step S62. Therefore, the subscriber stations receive the CQI report message from the base station through one message transmission by the base station, and detect the uplink resource through which the subscriber stations will transmit the channel measurement report to the base station.

As a result, since the process for requesting and allocating the bandwidth for a CQI report is not executed, the response message for transmitting the channel measurement report is transmitted to the base station within the minimum delay time (optionally allowable in one frame in the case of FIG. 4) in steps S63 to S65, and hence, the optimized AMC level is applicable when the base station and the subscriber stations are swiftly adapted to the variation of radio channel conditions and transmit data with each other.

A structure and operations of a device for requesting and reporting the channel quality information will now be described in detail, on the basis of the wireless portable Internet system, and without being restricted to this, will also be applicable to various other mobile communication systems.

Figure 5:
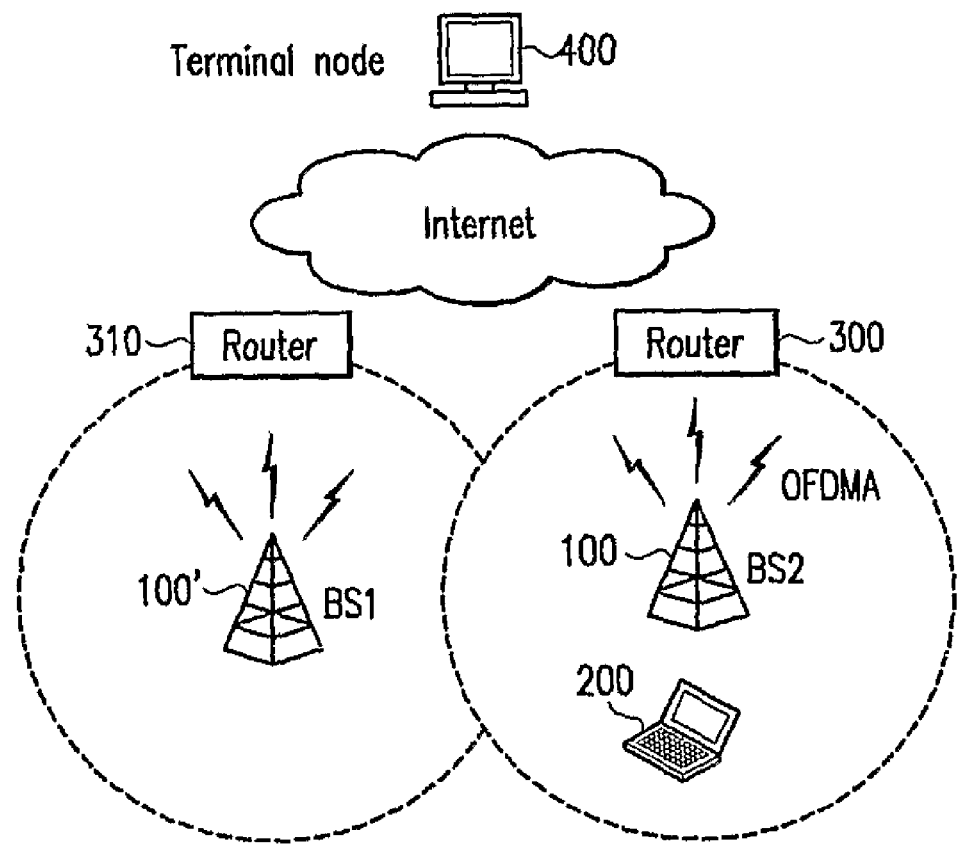
FIG. 5 shows a schematic diagram for a wireless portable Internet system according to an exemplary embodiment of the present invention.

FIG. 5 shows a schematic diagram for a wireless portable Internet system according to an exemplary embodiment of the present invention.

The wireless portable Internet system includes base stations 100 and 100', a subscriber station 200 for performing radio communication with the base stations, routers 300 and 310 connected to the base stations through a gateway, and the Internet.

The wireless portable Internet system guarantees mobility and provides seamless data communication services when the subscriber station 200 shown in FIG. 5 moves from a cell covered by a first base station 100 to another cell covered by a second base station 100', supports a handover, and allocates dynamic IP addresses as the subscriber station moves.

The wireless portable Internet subscriber station 200 and each of the base stations 100 and 100' communicate with each other through the orthogonal frequency division multiple access (OFDMA) method which is a multiplexing method having the frequency division method for using a plurality of orthogonal frequency subcarriers as a plurality of subchannels combined with the time-division multiplexing (TDM) method. The OFDMA method is resistant against fading generated by multipaths and has high data rates, and the exemplary embodiment is not restricted to the OFDMA method.

The IEEE 802.16e standard applies the AMC scheme between the subscriber station 200 and the base stations 100 and 100'.

Figure 6:
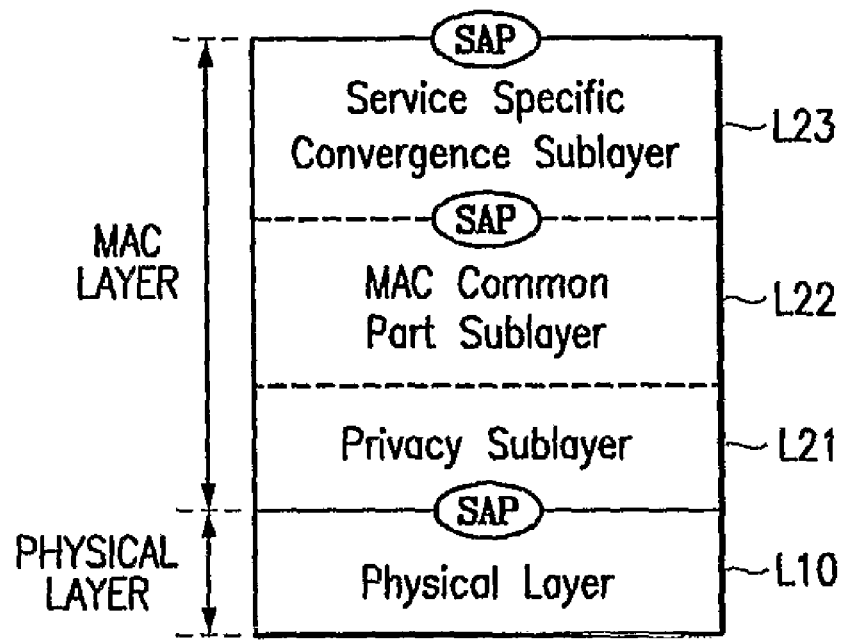
FIG. 6 shows a hierarchical diagram of a wireless portable Internet system.

FIG. 6 shows a hierarchical diagram of the IEEE 802.16e wireless portable Internet system including a physical layer L10 and medium access control (MAC) layers L21, L22, and L23.

The physical layer L10 performs wireless communication functions such as modulation/demodulation, coding/decoding, etc. as performed by a normal physical layer. According to the IEEE 802.16e, the wireless portable Internet system does not have function-specific MAC layers as a wired Internet system, but a single MAC layer in charge of different functions. The MAC layer includes a privacy sublayer L21, a MAC common part sublayer L22, and a service specific convergence sublayer L23.

The service specific convergence sublayer L23 performs payload header suppression and QoS mapping functions in consecutive data communication.

The MAC common part sublayer L22 is the core of the MAC layer which is in charge of system access, bandwidth allocation, connection establishment and maintenance, and QoS control. The privacy sublayer L21 performs functions of equipment authentication and security key exchange, and encryption. The device authentication is carried on by the privacy sublayer L21, and the user authentication by an upper layer of the MAC (not illustrated).

Figure 7:
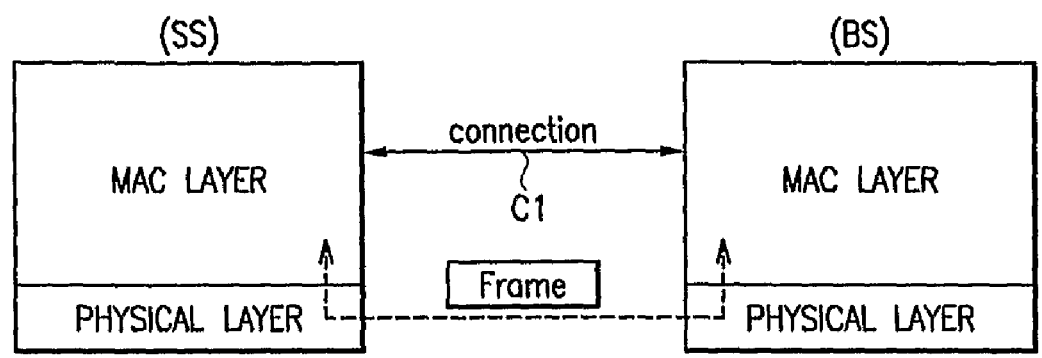
FIG. 7 shows a schematic diagram of a connection structure between a base station and a subscriber station in a wireless portable Internet system.

FIG. 7 shows a schematic diagram of a connection structure between a base station and a subscriber station in the wireless portable Internet system. A connection is provided between the MAC layers of the subscriber station and the base station. The term "connection C1" as used herein does not refer to a physical connection, but to a logical connection that is defined as a mapping relationship between the MAC peers of the subscriber station and the base station for traffic transmission of one service flow.

Hence, the parameter/message defined on the connection C1 refers to a function executed between the MAC peers. Actually, the parameter/message is processed into a frame, which is transferred through the physical layer and analyzed so as to control the MAC layer to execute the function corresponding to the parameter/message. A MAC message transferred through the connection C1 includes a connection identifier (CID) which is an MAC layer address for identifying the connection; radio resource allocation information (MAP) for defining a symbol offset and a subchannel offset of a burst time-divided by a subscriber station in a downlink/uplink, and defining a number of symbols of the allocated resource and a number of subchannels; and channel descriptors (including a downlink channel descriptor (DCD) and an uplink channel descriptor (UCD)) for describing a characteristic of a physical layer according to characteristics of the downlink/uplink. In addition, the MAC message includes various messages for performing request (REQ), response (RSP), and acknowledgment (ACK) for various operations.

Figure 8:
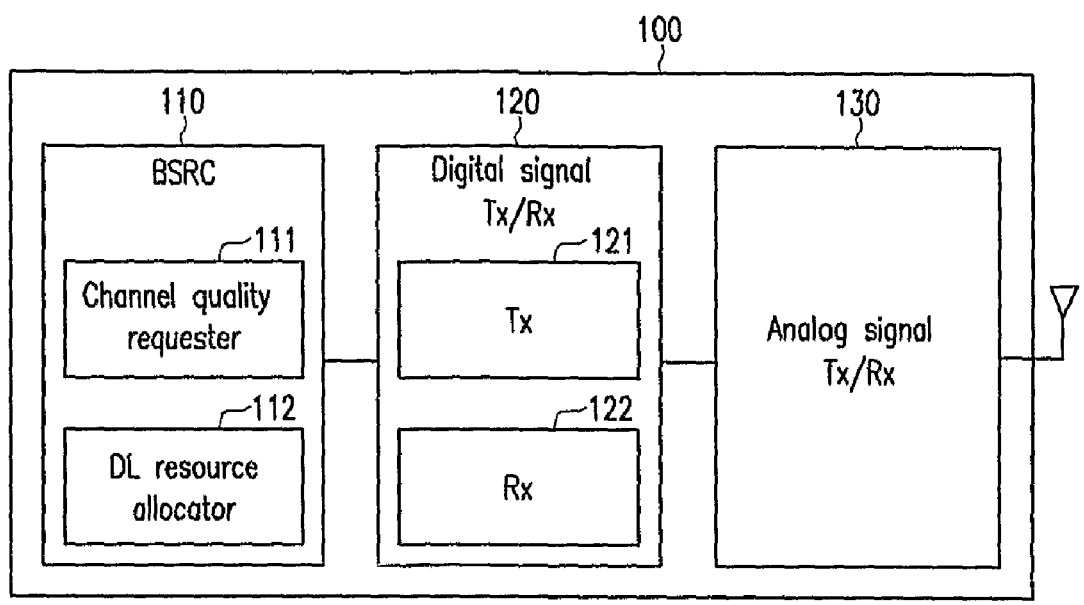
FIG. 8 shows a block diagram of a base station according to an exemplary embodiment of the present invention.

FIG. 8 shows a block diagram of a base station in the above-structured wireless portable Internet system according to an exemplary embodiment of the present invention.

The base station 100 includes a base station resource controller 110, a digital signal transceiver 120, and an analog signal transceiver 130.

The base station resource controller 110 includes a channel quality requester 111 for requesting channel quality measurement, and a downlink resource allocator 112 for allocating downlink radio resources according to channel quality information provided by the subscriber station.

The channel quality requester 111 requests channel quality information from the subscriber stations, and in particular, transmits a CQI report message for each frame to the subscriber stations.

Figure 9:
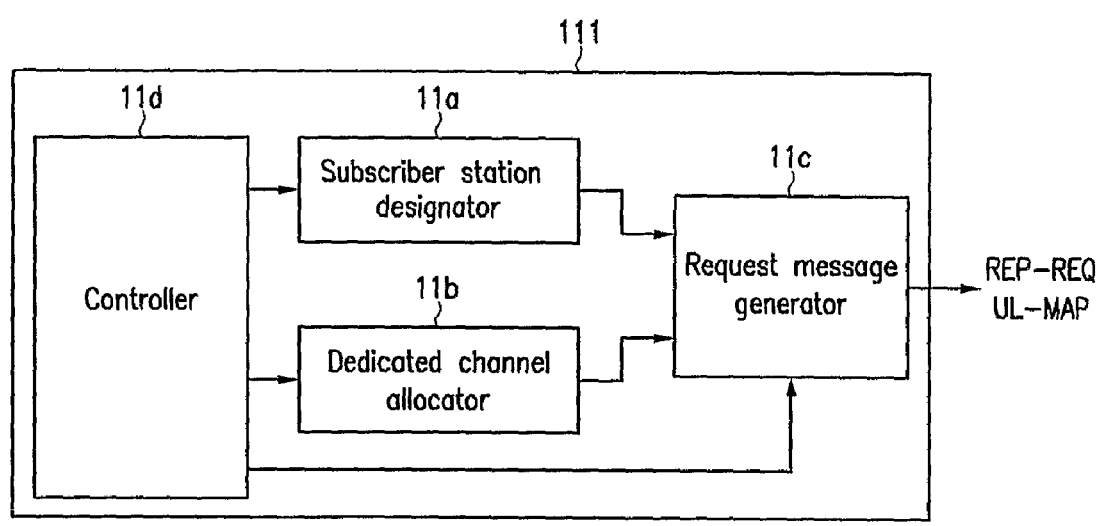
FIG. 9 shows a block diagram of the channel quality requester shown in FIG. 8.

FIG. 9 shows a block diagram of the channel quality requester 111.

The channel quality requester 111 includes a subscriber station designator 11a, a dedicated channel allocator 11b, a request message generator 11c, and a controller 11d for controlling the subscriber station designator 11a, the dedicated channel allocator 11b, and the request message generator 11c.

The subscriber station designator 11a designates subscriber stations to which a CQI report is transmitted. For example, the subscriber station designator 11a designates random subscriber stations or subscriber stations having a good forward channel quality and connected to the base station as those to which a CQI request is transmitted. For ease of description, the subscriber stations to which a CQI request is transmitted will be referred to as CQI requested subscriber stations. The subscriber station designator 11a provides identifiers (i.e., CIDs) of the CQI requested subscriber stations to the request message generator 11c. The CIDs represent unidirectional MAC layer addresses for identifying connections of the equivalent MAC peers of the base station and the subscriber stations, and the identifiers according to the exemplary embodiment are not restricted to the CIDs.

The request message generator 11c generates a CQI report message (referred to as a report request (REP_REQ) message hereinafter) and transmits the same to the designated subscriber stations. In particular, the request message generator 11c generates a REP_REQ message for each frame and concurrently requests the report from a plurality of subscriber stations.

In order to achieve the request, the request message generator 11c generates one REP_REQ message including identifiers of subscriber stations provided by the subscriber station designator 11a, and processes the REP_REQ message to be a broadcast message (e.g., a message which uses a broadcast CID according to the IEEE 802.16 standard). Therefore, the REP_REQ message is broadcast, and the respective subscriber stations selectively respond to the broadcast message depending on whether the identifier is included in the REP_REQ message.

In particular, a dedicated channel for reporting channel quality information is previously allocated to an uplink radio resource before the request message generator 11c transmits the REP_REQ message to the subscriber stations so that the subscriber stations may report the channel quality through the dedicated uplink channel without performing an additional channel allocation process when responding to the REP_REQ message.

The dedicated channel allocator 11b allocates a dedicated feedback channel which is a logical dedicated uplink channel for reporting channel quality information to the uplink radio resource, and transmits an uplink radio resource allocation information (referred to as a UL-MAP hereinafter) to the subscriber station before transmitting the REP_REQ message thereto. In addition, the dedicated channel allocator 11b allocates detailed resource positions to be used by the subscriber stations (e.g., CQI requested subscriber stations) within the dedicated feedback channel. The request message generator 11c arranges the identifiers of the subscriber stations in a predetermined order according to designated resource positions when the dedicated channel allocator 11b designates the resource positions of the respective subscriber stations in the dedicated feedback channel. In addition, the request message generator 11c can randomly arrange the identifiers of the CQI-requested subscriber stations.

The downlink resource allocator 112 uses the channel quality information included in a CQI response message (referred to as a report response (REP_RSP) message hereinafter) provided by the subscriber stations according to the REP_REQ message, and determines scheduling and an AMC level for the respective subscriber stations to be transmitted in the downlink.

The digital signal transceiver 120 includes a transmitter 121 and a receiver 122. The transmitter 121 modulates and encodes the REP_REQ message provided by the base station resource controller 110, and the analog signal transceiver 130 broadcasts the modulated and encoded message to the subscriber stations over the air.

The analog signal transceiver 130 and the receiver 122 of the digital signal transceiver 120 receive the message from the subscriber stations which respond to the broadcast REP_REQ message, and transmit the message to the base station resource controller 110.

A structure of the subscriber station for measuring and reporting the quality of the channel according to a corresponding channel quality request provided by the base station 100 will now be described.

Figure 10:
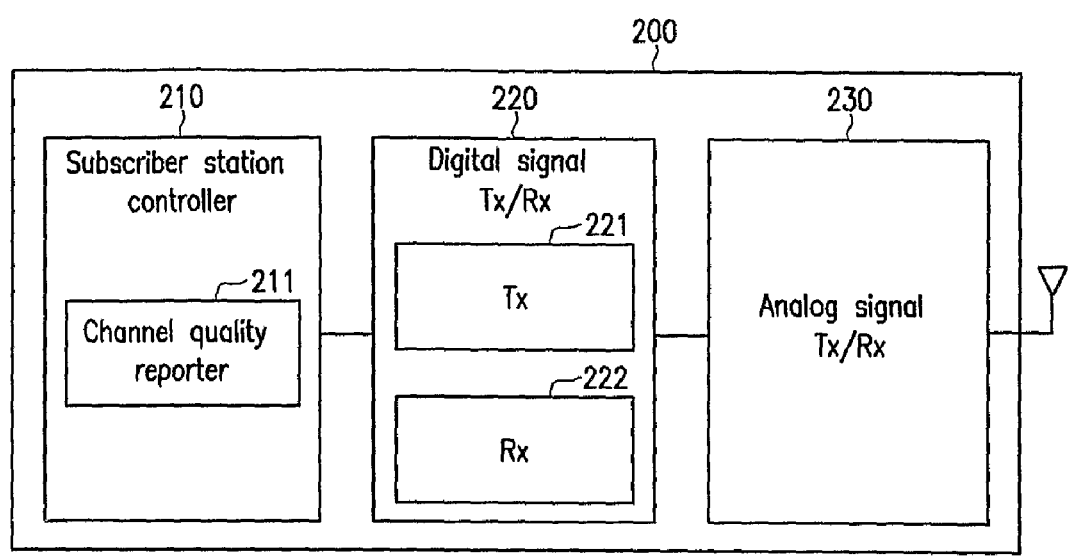
FIG. 10 shows a block diagram of a subscriber station according to an exemplary embodiment of the present invention.

FIG. 10 shows the structure of the subscriber station 200 according to an exemplary embodiment of the present invention.

The subscriber station 200 includes a subscriber station controller 210, a digital signal transceiver 220, and an analog signal transceiver 230.

The subscriber station controller 210 includes a channel quality reporter 211, and the digital signal transceiver 220 includes a transmitter 221 and a receiver 220. The analog signal transceiver 230 processes modulated and encoded digital signals and wirelessly transmits processed signals.

The subscriber station controller 210 may further comprise a plurality of devices for transmitting and receiving data to/from the base station 100 and processing the data, which will not be described since they are well known to a person skilled in the art.

The channel quality reporter 211 measures and reports the quality of corresponding channels according to the REP_REQ message provided by the base station 100.

Figure 11:
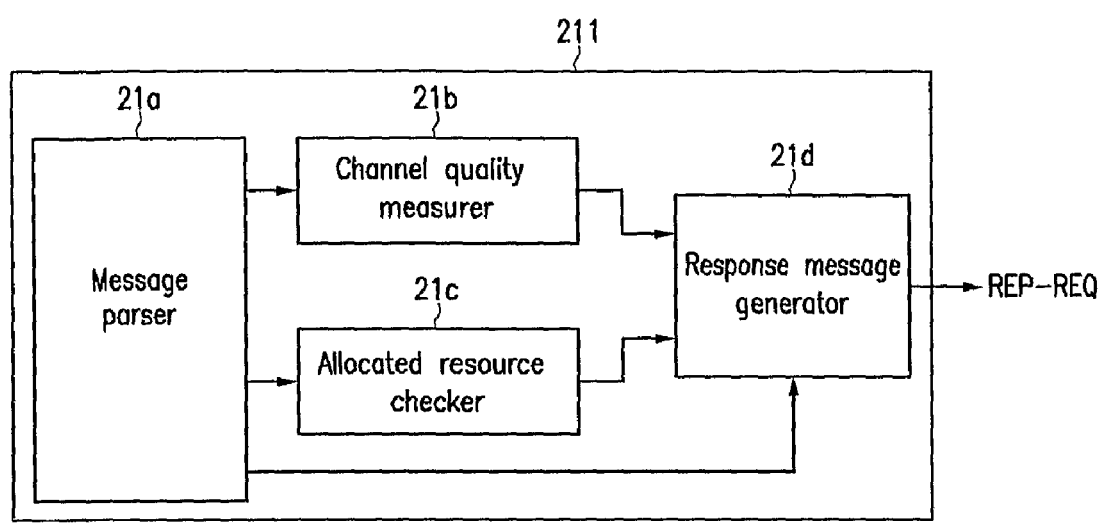
FIG. 11 shows a block diagram of the channel quality reporter shown in FIG. 10.

FIG. 11 shows a block diagram of the channel quality reporter 211.

As shown, the channel quality reporter 211 includes a message parser 21a, a channel quality measurer 21b, an allocated resource checker 21c, and a response message generator 21d.

The message parser 21a parses the message provided by the receiver 222 to check the type of the message, and drives the channel quality measurer 21b when the message is found to be a REP_REQ message.

The channel quality measurer 21b measures the quality of the downlink channel through which the message is transmitted, and for example, measures the carrier to interference noise ratio (CINR) based on the signals transmitted through the downlink channel. Methods and devices for measuring the CINR are realized by using well-known means, and hence, no corresponding description will be provided.

The allocated resource checker 21c stores the UL-MAP provided by the base station 100, and uses the UL-MAP and the REP_REQ to check the uplink resources to be used to transmit a quality report of the allocated channel of the corresponding subscriber station. In detail, the allocated resource checker 21c uses basic CIDs included in the REP_REQ message to check the order of the corresponding subscriber station, and then checks the detailed position of the radio resource to be used by the subscriber station from the dedicated feedback channel designated in the UL-MAP according to the checked order.

The response message generator 21d generates a REP_RSP message including the channel quality information provided by the channel quality measurer 21b.

Therefore, the transmitter 221 of the digital signal transceiver 220 transmits the REP_RSP message to the base station 100 through the designated resource of the dedicated feedback channel.

The digital transceivers 120 and 220 and the analog signal transceivers 130 and 230 of the base station and the subscriber station will not be described since they are well known to a person skilled in the art.

Figure 12:
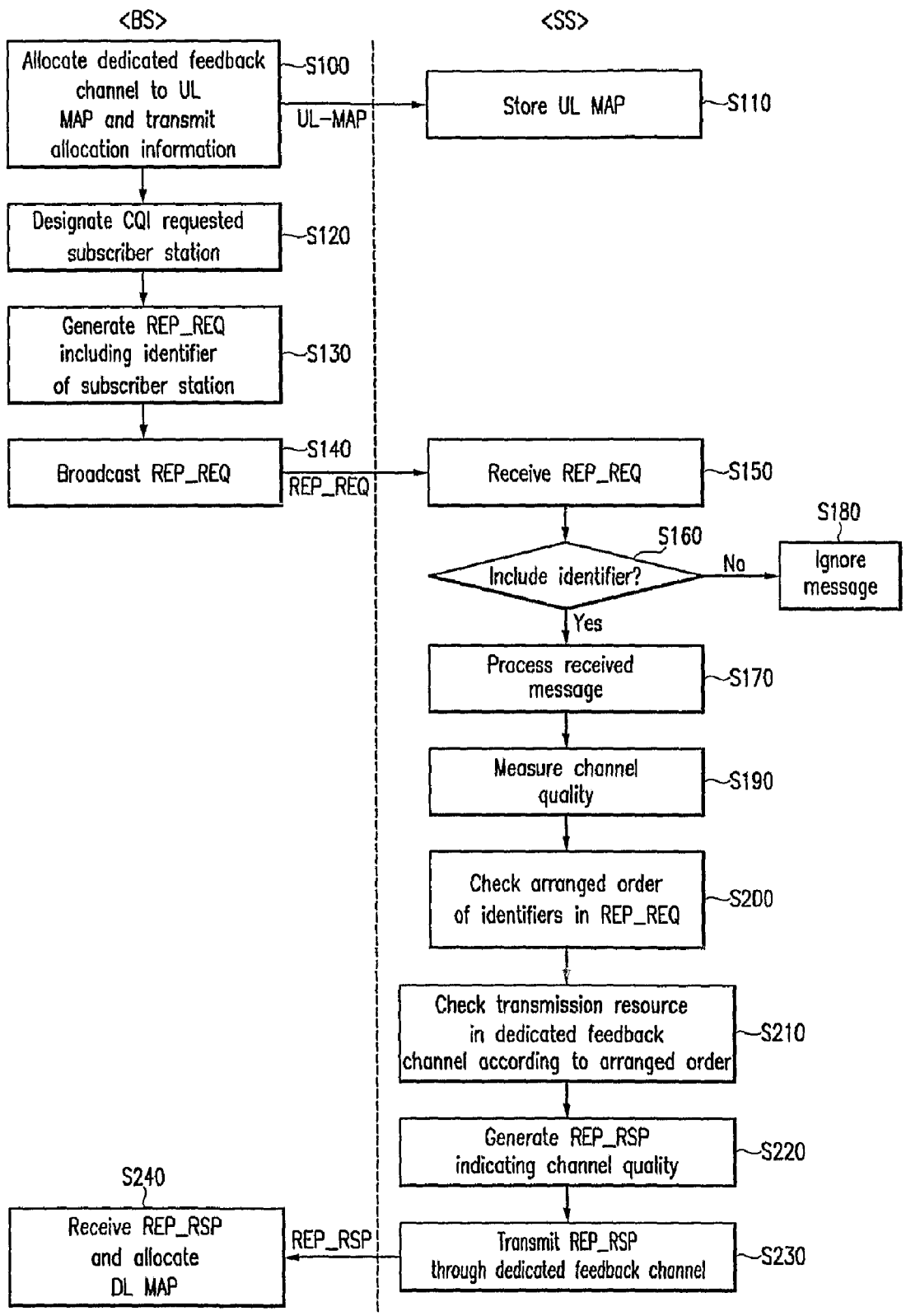
FIG. 12 shows a flowchart for requesting and reporting channel quality information according to an exemplary embodiment of the present invention.

A detailed method for requesting and reporting the channel quality information will now be described with reference to FIG. 12.

The base station 100 generates a REP_REQ message and transmits the same to the subscriber stations in order to obtain information on the channel quality states used for determining the AMC level of the subscriber stations on the move.

To perform this process, the dedicated channel allocator 11b of the base station resource controller 110 allocates in advance a dedicated feedback channel used for a channel quality report to the subscriber stations. That is, the dedicated channel allocator 11b allocates a dedicated feedback channel to the UL-MAP through which the data are transmitted to the base station from the subscriber station, and transmits the UL-MAP to the subscriber stations through the broadcast channel in step S100. The subscriber station controller 210 of the subscriber station 200 receives the UL-MAP from the base station 100 and stores the same in step S110, and uses the UL-MAP to generate a channel quality report.

The subscriber station designator 11a designates subscriber stations to which a CQI report message will be transmitted in step S120, and provides identifiers for the designated subscriber stations to the request message generator 11c. In this instance, the dedicated channel allocator 11b may determine detailed resource positions of the designated subscriber stations in the dedicated feedback channel of the UL-MAP.

The request message generator 11c generates a REP_REQ including report format information which represents formats by which the subscriber stations transmit channel quality reports, and identifiers of at least one CQI requested subscriber station in step S130. In this instance, the request message generator 11c may determine the order for arranging the identifiers according to the detailed resource positions of the respective subscriber stations determined by the dedicated channel allocator 11b. FIG. 13 shows an exemplified format of the REP_REQ message which includes format information for defining reporting formats of the channel quality information.

The REP_REQ message is then processed to be a broadcast message and is transmitted to the digital signal transceiver 120, and the transmitter 121 thereof broadcasts the REP_REQ message in step S140.

The respective subscriber stations 200 receive the REP_REQ message broadcast and transmitted by the base station 100 in step S150, and provide the REP_REQ message to the subscriber station controller 210 through the receiver 222 of the digital signal transceiver 220 of each subscriber station 200.

The channel quality reporter 211 of the subscriber station controller 210 processes the received message when the message relates to the corresponding subscriber station, and ignores the message when the same does not relate to the corresponding subscriber station.

In detail, the message parser 21a of the channel quality reporter 211 determines whether the message relates to the corresponding subscriber station depending on whether the received message includes the identifier of the corresponding subscriber station in step S160. The channel quality reporter 211 responds to the REP_REQ message in step S170 when it is found that the received message has the identifier of the subscriber station and is a REP_REQ message, and the channel quality reporter 211 ignores the message and performs no process in step S180 when the received message has no identifier thereof.

The channel quality measurer 21b measures the CINR of the downlink based on the REP_REQ message in step S190 when the message is found to be the REP_REQ message.

Figure 14:
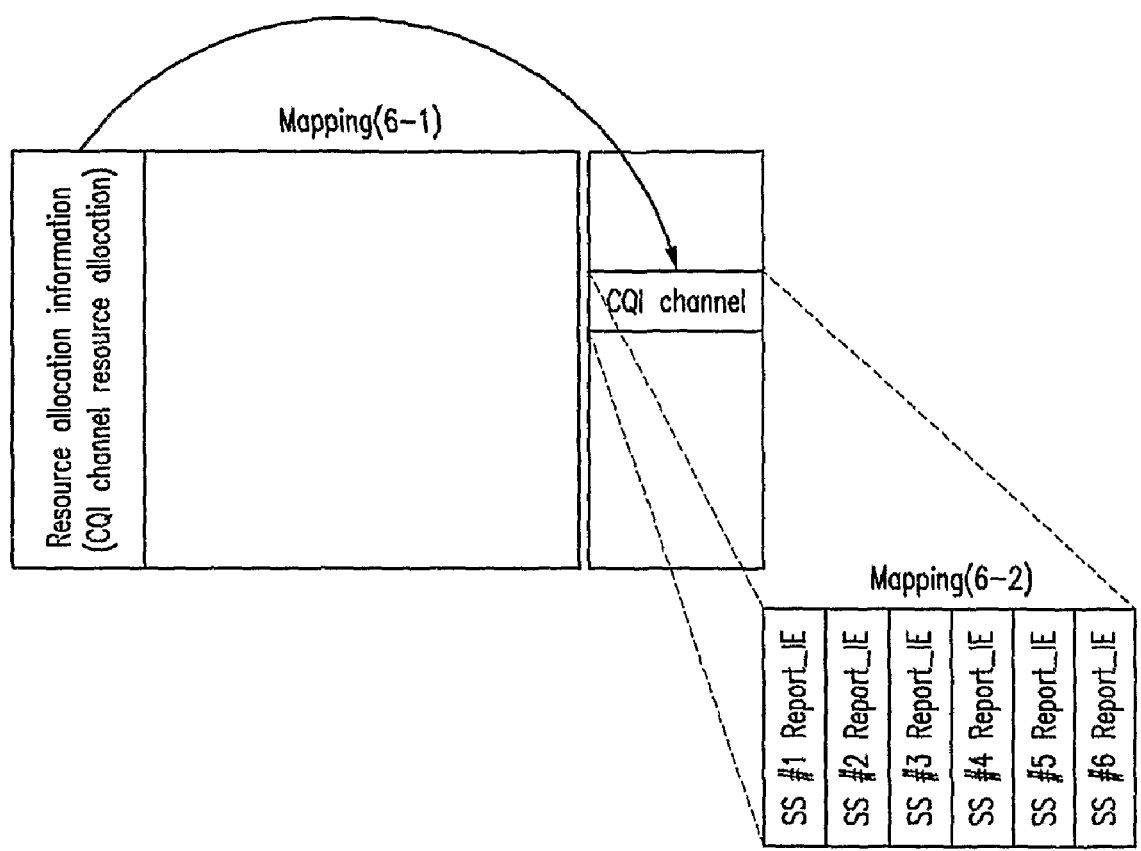
FIG. 14 shows a process for checking the radio resource allocated to the subscriber station according to the CQI report message according to an exemplary embodiment of the present invention.

The allocated resource checker 21c uses the REP_REQ message and checks the resource allocated to the uplink for a channel measurement report for each corresponding subscriber station. FIG. 14 shows a process for checking the radio resource allocated to the subscriber station having received the REP_REQ message. As shown, the allocated resource checker 21c checks the dedicated feedback channel used for reporting channel quality information and measured from the UL-MAP, checks the position of the basic CIDs for identifying the subscriber stations, and checks the detailed resource position used by the corresponding subscriber station in the dedicated feedback channel of the UL-MAP according to the checked order in steps S200 and S210. FIG. 14 exemplifies the uplink resource allocation in the OFDMA system, and the exemplary embodiment is not restricted to the OFDMA system. For example, time-division systems may apply the temporal allocation order of uplink resources according to an appearance order of identifiers of subscriber stations designated in the REP_REQ message.

The response message generator 21d uses the report format included in the REP_REQ message and generates a REP_RSP message including channel quality information and cyclic redundancy check (CRC) information for checking transmission errors, provided by the channel quality measurer 21b in step S220. The REP_RSP message includes a channel quality information codeword.

Therefore, the REP_RSP message is transmitted to the base station 100 through the digital signal transceiver 220, the analog signal transceiver 230, and the designated resource position of the channel dedicated feedback channel checked by the resource allocation checker 21c in step S230.

The downlink resource allocator 112 of the base station 100 uses an average value and a deviation value of the downlink CINR included in the REP_RSP provided by the subscriber stations through the dedicated feedback channel, and determines scheduling and an AMC level for each subscriber station when transmitting data in the downlink in step S240.

Accordingly, system performance is enhanced through an increase of downlink transmission capacity since the optimized AMC level is applicable to the case when a base station transmits data to a corresponding subscriber station or vice versa by quickly controlling the variation of mobile radio channel conditions.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the exemplary embodiment, an uplink resource for transmitting channel quality information by a subscriber station is allocated in advance when a CQI report message is provided to the subscriber station in the mobile communication system, and therefore, the delayed time generated when the subscriber station transmits a channel measurement report to the base station is minimized to quickly process a fast variation of the channel environment.

As a result, reliable channel quality information for determining the AMC level of data transmission is quickly and efficiently provided in the mobile communication system (or the wireless Internet system).

Also, swift adaptation to the most recent channel quality is allowed to thus apply the most efficient AMC level when transmitting data to/from the corresponding subscriber station.

In addition, since the CQI report message is broadcast to the respective subscriber stations and the identifiers of the subscriber stations are provided as parameters, the overheads of message transmission are substantially reduced compared to the case in which each subscriber station individually receives the CQI report message, and the subscriber stations can receive the above-noted message without errors.

In particular, since the subscriber stations obtain information of an uplink resource for a quality measurement report from the order of identifiers of subscriber station included in the CQI report message, the subscriber stations transmit data by adding a CRC thereto without header information, thereby quickly and efficiently providing reliable channel quality information.

What is claimed is:

1. A method for reporting Channel Quality Information (CQI) by a subscriber station in a mobile communication system, comprising:
   (a) receiving uplink radio resource allocation information to which a dedicated feedback channel for reporting the CQI is allocated from a base station;
   (b) receiving a CQI report message from the base station;
   (c) measuring a radio channel quality for communication with the base station, and generating channel quality information;
   (d) generating a CQI response message including the channel quality information; and
   (e) transmitting the CQI response message to the base station through a dedicated feedback channel in the uplink,
   wherein transmitting the CQI response message comprises:
   checking an order of identifiers of corresponding subscriber stations arranged in the CQI report message;
   identifying a radio resource allocated to the subscriber station in the order of the CQI report requested to each subscriber station; and
   transmitting a CQI response message to the base station through the identified radio resource in the dedicated feedback channel.

2. The method of claim 1, wherein the CQI report message is broadcast.

3. The method of claim 2, wherein the CQI report message includes the identifiers arranged in a predetermined order.

4. The method of claim 3, wherein the identifiers are Connection IDentifiers (CIDs).

5. The method of claim 1, wherein the CQI response message further includes a Cyclic Redundancy Check (CRC) in addition to the channel quality information.

6. The method of claim 1, wherein the CQI response message includes a channel quality information codeword.

7. The method of claim 1, wherein the CQI report message includes format information for reporting the channel quality information.

8. A method for requesting and reporting radio Channel Quality Information (CQI) in a mobile communication system to which a base station and subscriber stations are coupled through a mobile communication network, comprising:
   (a) allowing the base station to allocate a dedicated feedback channel for channel quality report, and transmitting the allocation information to the subscriber stations;

(b) generating a CQI report message, broadcasting the CQI report message, and requesting a CQI report from at least one subscriber station;

(c) allowing the subscriber stations to receive the CQI report message, measure radio channel quality for communication link to the base station, and generate channel quality information; and (d) allowing the subscriber station to generate a CQI response message including channel quality information and transmit the CQI response message to the base station through a dedicated feedback channel for channel quality report, wherein the CQI response message includes identifiers of at least one subscriber station arranged in a predetermined order, and allowing the subscriber station to generate the CQI response message including the channel quality information and transmit the CQI response message to the base station through the dedicated feedback channel for channel quality report comprises:

checking the order of identifiers of corresponding subscriber stations arranged in the CQI response message;

identifying a radio resource position allocated to the subscriber station in the order of the CQI report requested to each subscriber station; and transmitting the CQI response message to the base station through the identified radio resource in the dedicated feedback channel.

9. The method of claim 8, wherein the requesting and reporting method is applied to a wireless portable Internet system.

10. A subscriber station for reporting Channel Quality Information (CQI) in a mobile communication system, comprising:

a message parser for receiving a CQI report message from a base station and parsing the CQI report message;

a channel quality measurer for measuring a radio channel quality of the communication link to the base station, and generating channel quality information;

a response message generator for generating a CQI response message including the channel quality information;

a resource allocation checker for receiving uplink radio resource allocation information with a dedicated feedback channel for CQI report provided by the base station, storing the uplink radio resource allocation information, and checking an allocated radio resource for CQI report according to the parsed message result; and a transmitter for transmitting the CQI response message to the base station through the allocated radio resource, wherein the CQI report message includes identifiers of at least one subscriber station arranged in a predetermined order, and the resource allocation checker checks a radio resource position at which the subscriber station reports channel quality information through the dedicated feedback channel according to the order of identifiers of the corresponding subscriber stations arranged in the CQI report message.

* * * * *